US009411568B2

(12) United States Patent
Syme et al.

(10) Patent No.: US 9,411,568 B2
(45) Date of Patent: Aug. 9, 2016

(54) ASYNCHRONOUS WORKFLOWS (75) Inventors: Donald Syme, Grantchester (GB); Luke Hoban, Seattle, WA (US); Timothy Yat Tim Ng, Bellevue, WA (US); Dmitry Lomov, Redmond, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 917 days.

(21) Appl. No.: 12/760,571

(22) Filed: Apr. 15, 2010

(65) Prior Publication Data
US 2011/0258594 A1 Oct. 20, 2011

(51) Int. Cl.
*G06F 9/44* (2006.01)
*G06F 9/45* (2006.01)

(52) U.S. Cl.
CPC ............. *G06F 8/458* (2013.01); *G06F 8/445* (2013.01); *G06F 9/444* (2013.01)

(58) Field of Classification Search
CPC .......... G06F 8/445; G06F 8/458; G06F 9/444
See application file for complete search history.

(56) References Cited

U.S. PATENT DOCUMENTS

| | | | | |
|---|---|---|---|---|
| 5,551,040 | A * | 8/1996 | Blewett | 717/106 |
| 5,628,016 | A * | 5/1997 | Kukol | G06F 8/445 717/114 |
| 7,206,807 | B2 * | 4/2007 | Cheenath | 709/203 |
| 7,248,603 | B1 * | 7/2007 | Grunkemeyer et al. | 370/466 |
| 7,280,558 | B1 * | 10/2007 | Grunkemeyer et al. | 370/466 |
| 2003/0041086 | A1 * | 2/2003 | Lankreijer | G06F 8/458 718/102 |
| 2004/0172626 | A1 * | 9/2004 | Jalan | G06F 8/458 717/149 |
| 2005/0004786 | A1 * | 1/2005 | Thomason | 703/17 |
| 2005/0246692 | A1 * | 11/2005 | Poteryakhin | G06F 8/458 717/140 |
| 2006/0224924 | A1 * | 10/2006 | Grieskamp et al. | 714/38 |
| 2006/0225049 | A1 * | 10/2006 | Lv | G06F 8/445 717/128 |
| 2008/0120129 | A1 * | 5/2008 | Seubert et al. | 705/1 |
| 2008/0127233 | A1 * | 5/2008 | Neil et al. | 719/330 |
| 2008/0134155 | A1 * | 6/2008 | Miller | G06F 9/444 717/139 |

(Continued)

FOREIGN PATENT DOCUMENTS

| | | |
|---|---|---|
| CN | 1325217 A | 12/2001 |
| CN | 1567906 A | 1/2005 |

OTHER PUBLICATIONS

Hassan Gomaa, "Designing Concurrent, Distributed, and Real-Time Applications with UML",[Online], 2001,pp. 737-738, [Retrieved from Internet on Feb. 5, 2013], <http://citeseerx.ist.psu.edu/viewdoc/download?doi=10.1.1.100.3619&rep=rep1&type=pdf>.*

(Continued)

*Primary Examiner* — Thuy Dao
*Assistant Examiner* — Ziaul A Chowdhury
(74) *Attorney, Agent, or Firm* — Kevin Sullivan; Kate Drakos; Micky Minhas (57) ABSTRACT

A system and method for implementing an asynchronous construct in a computer program. A state machine is generated from the computer program, and the program is translated to generate code that executes the state machine during runtime. The asynchronous construct may be made into a function that invokes an asynchronous function, passing the function as a callback, and then exits. When the asynchronous operation completes, the function is invoked as a callback, returning to a configuration equivalent to that prior to the asynchronous call. Variable closure may be used to maintain the state of variables during a state prior to invoking the asynchronous operation and a state after invoking the asynchronous operation.

20 Claims, 9 Drawing Sheets

(56) References Cited

U.S. PATENT DOCUMENTS

| | | | |
|---|---|---|---|
| 2008/0244516 A1* | 10/2008 | Meijer et al. ................ | 717/116 |
| 2009/0300591 A1 | 12/2009 | Duffy et al. | |
| 2009/0300648 A1 | 12/2009 | Box et al. | |
| 2010/0005466 A1* | 1/2010 | MacFarlane et al. ......... | 718/100 |
| 2010/0168912 A1* | 7/2010 | Lee et al. ..................... | 700/245 |
| 2010/0287550 A1* | 11/2010 | Eichenberger .......... | G06F 8/445 |
| | | | 718/100 |
| 2011/0173595 A1* | 7/2011 | Gustafsson ............. | G06F 8/433 |
| | | | 717/146 |
| 2011/0239186 A1* | 9/2011 | Zinkovsky et al. ........... | 717/107 |
| 2011/0246962 A1* | 10/2011 | Meijer .................... | G06F 9/444 |
| | | | 717/106 |

OTHER PUBLICATIONS

Steven M. Nowick et al., "Synthesis of Asynchronous State Machines Using a Local Clock", [Online], IEEE 1991,pp. 192-197, [Retrived from Internet on Feb. 5, 2013], <http://ieeexplore.ieee.org/stamp/stamp.jsp?tp=&arnumber=139879>.*

Don Syme et al., "The F# Asynchronous Programming Model", [Online], 2011, pp. 1-15, [Retrieved from Internet on Mar. 30, 2016], < http://tomasp.net/academic/papers/async/async.pdf>.*

Tomas Petricek, "Encoding monadic computations in C# using iterators" [Online], 2009, pp. 61-69, [Retrieved from Internet on Mar. 30, 2016], < http://ceur-ws.org/Vol-584/paper9.pdf>.*

H. Franke et al., "Introduction to the wire-speed processor and architecture", [Online], 2010, pp. 1-11, [Retrieved from Internet on Mar. 30, 2016], <http://www1.cs.columbia.edu/~cs4824/handouts/franke_2010.pdf>.*

Jos'e Duato et al., "rCUDA: Reducing the Number of GPU-Based Accelerators in High Performance Clusters", [Online], IEEE 2010, pp. 224-231, < http://ieeexplore.ieee.org/stamp/stamp.jsp?tp=&arnumber=5547126>.*

"Introducing F# Asynchronous Workflows", Retrieved at << http://blogs.msdn.com/dsyme/archive/2007/10/11/introducing-f-asynchronous-workflows.aspx >>, Oct. 11, 2007, pp. 12.

Gustafsson, Niklas., "AXUM", Retrieved at << http://download.microsoft.com/download/B/D/5/BD51FFB2-C777-43B0-AC24-BDE3C88E231F/Axum%20Language%20Spec.pdf >>, Jun. 16, 2009, pp. 1-42.

Chroboczek, Juliusz., "Continuation Passing for C: A Space-efficient Implementation of Concurrency", Retrieved at << http://www.pps.jussieu.fr/~jch/cpc.pdf >>, PPS technical report, Mar. 3, 2006, pp. 1-9.

"Workflows, Asynchronous & Parallel Programming", Retrieved at << http://www.ctocorner.com/fsharp/book/ch16.aspx >>, Retrieved Date: Feb. 25, 2010, pp.

Syme, et al., "Expert F#", Retrieved at <<http://download.microsoft.com/download/b/b/6/bb666ebe-e643-496f-b290-03527d157b47/Expert.F.Sharp_Ch13_8504Syme.pdf >>, Retrieved Date: Feb. 25, 2010, pp. 40.

"Encoding Monadic Computations using Iterators in C# 2.0", Retrieved at << http://tomasp.net/academic/papers/monads-supplementary.pdf >>, Retrieved Date: Feb. 25, 2010, p. 1.

"First Office Action and Search Report Issued in Chinese Patent Application No. 201110102138.9", Mailed Date: Nov. 2, 2014, 10 Pages.

"Second Office Action Received for China Patent Application No. 201110102138.9", Mailed Date: Jul. 9, 2015, 6 Pages.

* cited by examiner

```
Run() {
    start:
    switch (state) {
        case A: {A}
            state:= B;
            goto start;
        case B: {B}
            state := if ... then D else C
            goto start;
        case C': {C'}
            async operation ( func()->state:=C"; Run() )
            break;
        case C": {C"}
            state := B;
            goto start;
        case D: {D}
            break;
    }
    ...
}
```

```
Run() {
    start:
    switch (state) {
      case A:  {A}
        state:= B;
        goto start;
      case B: {B}
        state := if ... then D else C
        goto start;
      case C': {C'}
        async operation ( func()->state:=C"; Run() )
        break;
      case C": {C"}
        async operation ( func()->state:=C'"; Run() )
        break;
      case C'": {C'"}
        state := B;
        goto start;
      case D: {D}
        break;
    }
    ...
}
```
802

ASYNCHRONOUS WORKFLOWS

BACKGROUND

Computer programs often use asynchronous mechanisms to perform tasks that may take a long time to complete, relative to CPU processing speeds. Examples of this are reading or writing to a disk, communicating with a remote computer, or querying a database. Asynchronous operations allow a user interface to remain responsive while the application performs other work or waits for an event to occur.

An asynchronous workflow is a construct that enables a program to perform asynchronous operations without blocking threads. The F# programming language provides mechanisms that allow a program to include asynchronous workflow. A program may, for example, specify a first operation such as a Web request and a second operation, such as processing the result that is received. This may be implemented by beginning execution of the first operation, and placing the second operation on a continuation. The continuation has a corresponding callback function, so that when the first operation completes, the callback function is invoked and the second operation executes. In this way, the thread upon which the first operation is executing can be released while the operation is waiting, and reused for another operation. This allows more operations to be invoked than there are threads. It also synchronizes the first and second operations, so that the second operation is suspended until the first operation completes.

SUMMARY

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter.

Briefly, a system, method, and components operate to implement an asynchronous workflow that has been specified in a computer program language. The target computer program may be translated into a representation of a state machine. Executable program code may be generated based on the representation of the state machine, the executable program code implementing the state machine. The executable program code may include a first state corresponding to a first code fragment that includes an instruction for invoking an asynchronous operation, and a second state corresponding to a second code fragment that is to be executed after the asynchronous operation completes.

In one embodiment, after invoking the asynchronous operation, the thread is released. After executing the asynchronous operation, the state machine may be set to the second state, so that the second code fragment will be executed when the state machine resumes.

In one embodiment, translation of the computer program includes creation of a function that includes the asynchronous workflow. After invoking the asynchronous operation, this function returns. After completion of the asynchronous operation, the function is invoked, simulating a runtime in which the function persisted during the asynchronous operation.

In one embodiment, a variable closure is created for local variables or parameters, so that when the function resumes, the closed over variables persist in their previous state.

The mechanisms may be used to implement multiple asynchronous operations in a way that avoids recursive calls and growing of the runtime stack for each asynchronous operation.

To the accomplishment of the foregoing and related ends, certain illustrative aspects of the system are described herein in connection with the following description and the annexed drawings. These aspects are indicative, however, of but a few of the various ways in which the principles of the invention may be employed and the present invention is intended to include all such aspects and their equivalents. Other advantages and novel features of the invention may become apparent from the following detailed description of the invention when considered in conjunction with the drawings.

BRIEF DESCRIPTION OF THE DRAWINGS

Non-limiting and non-exhaustive embodiments of the present invention are described with reference to the following drawings. In the drawings, like reference numerals refer to like parts throughout the various figures unless otherwise specified.

To assist in understanding the present invention, reference will be made to the following Detailed Description, which is to be read in association with the accompanying drawings, wherein.

DETAILED DESCRIPTION

Example embodiments of the present invention now will be described more fully hereinafter with reference to the accompanying drawings, which form a part hereof, and which show, by way of illustration, specific example embodiments by which the invention may be practiced. This invention may, however, be embodied in many different forms and should not be construed as limited to the embodiments set forth herein; rather, these embodiments are provided so that this disclosure will be thorough and complete, and will fully convey the scope of the invention to those skilled in the art. Among other things, the present invention may be embodied as methods or devices. Accordingly, the present invention may take the form of an entirely hardware embodiment, an entirely software embodiment or an embodiment combining software and hardware aspects. The following detailed description is, therefore, not to be taken in a limiting sense.

Throughout the specification and claims, the following terms take the meanings explicitly associated herein, unless the context clearly dictates otherwise. The phrase "in one embodiment" as used herein does not necessarily refer to a previous embodiment, though it may. Furthermore, the phrase "in another embodiment" as used herein does not necessarily refer to a different embodiment, although it may. Thus, various embodiments of the invention may be readily combined, without departing from the scope or spirit of the invention. Similarly, the phrase "in one implementation" as used herein does not necessarily refer to the same implementation, though it may, and techniques of various implementations may be combined.

In addition, as used herein, the term "or" is an inclusive "or" operator, and is equivalent to the term "and/or," unless the context clearly dictates otherwise. The term "based on" is not exclusive and allows for being based on additional factors not described, unless the context clearly dictates otherwise. In addition, throughout the specification, the meaning of "a," "an," and "the" include plural references. The meaning of "in" includes "in" and "on."

The components described herein may execute from various computer-readable media having various data structures thereon. The components may communicate via local or remote processes such as in accordance with a signal having one or more data packets (e.g. data from one component interacting with another component in a local system, distributed system, or across a network such as the Internet with other systems via the signal). Software components may be stored, for example, on non-transitory computer-readable storage media including, but not limited to, an application specific integrated circuit (ASIC), compact disk (CD), digital versatile disk (DVD), random access memory (RAM), read only memory (ROM), floppy disk, hard disk, electrically erasable programmable read only memory (EEPROM), flash memory, or a memory stick in accordance with embodiments of the present invention.

The term computer-readable media as used herein includes both non-transitory storage media and communications media. Communications media typically embody computer-readable instructions, data structures, program modules, or other data in a modulated data signal such as a carrier wave or other transport mechanism and include any information-delivery media. By way of example, and not limitation, communications media include wired media, such as wired networks and direct-wired connections, and wireless media such as acoustic, radio, infrared, and other wireless media.

As used herein, the term "application" refers to a computer program or a portion thereof, and may include associated data. An application may be an independent program, or it may be designed to provide one or more features to another application. An "add-in" and a "plug-in" are examples of applications that interact with and provides features to a "host" application.

An application is made up of any combination of application components, which may include program instructions, data, text, object code, images or other media, security certificates, scripts, or other software components that may be installed on a computing device to enable the device to perform desired functions. Application components may exist in the form of files, libraries, pages, binary blocks, or streams of data.

As used herein, unless otherwise indicated by the context, the term "function" refers to a portion of code within a larger program that performs a specific task, and can execute relatively independent of other portions of the program. A function may, but does not necessarily, return a value. In various computer languages, different terms may be used, such as subroutine, method, procedure, or subprogram. As used herein, the term "function" may include all of these.

As used herein, the term "thread" refers to a thread of execution. A thread may be a software thread or a hardware thread. In a hardware multi-threaded processor, two or more threads may concurrently exist on the processor. Some processors provide multiple sets of registers or other components, so that multiple hardware threads may each have their own set of registers. A hardware multi-threaded processor may have a number of software threads that is greater than the number of hardware threads it supports. An operating system may manage the software threads, providing each a turn at executing as a hardware thread.

As used herein, a multi-threaded system is a system that supports multiple threads, which may be software or hardware threads. A multi-threaded system may or may not have hardware support for multi-threading.

Figure 1:
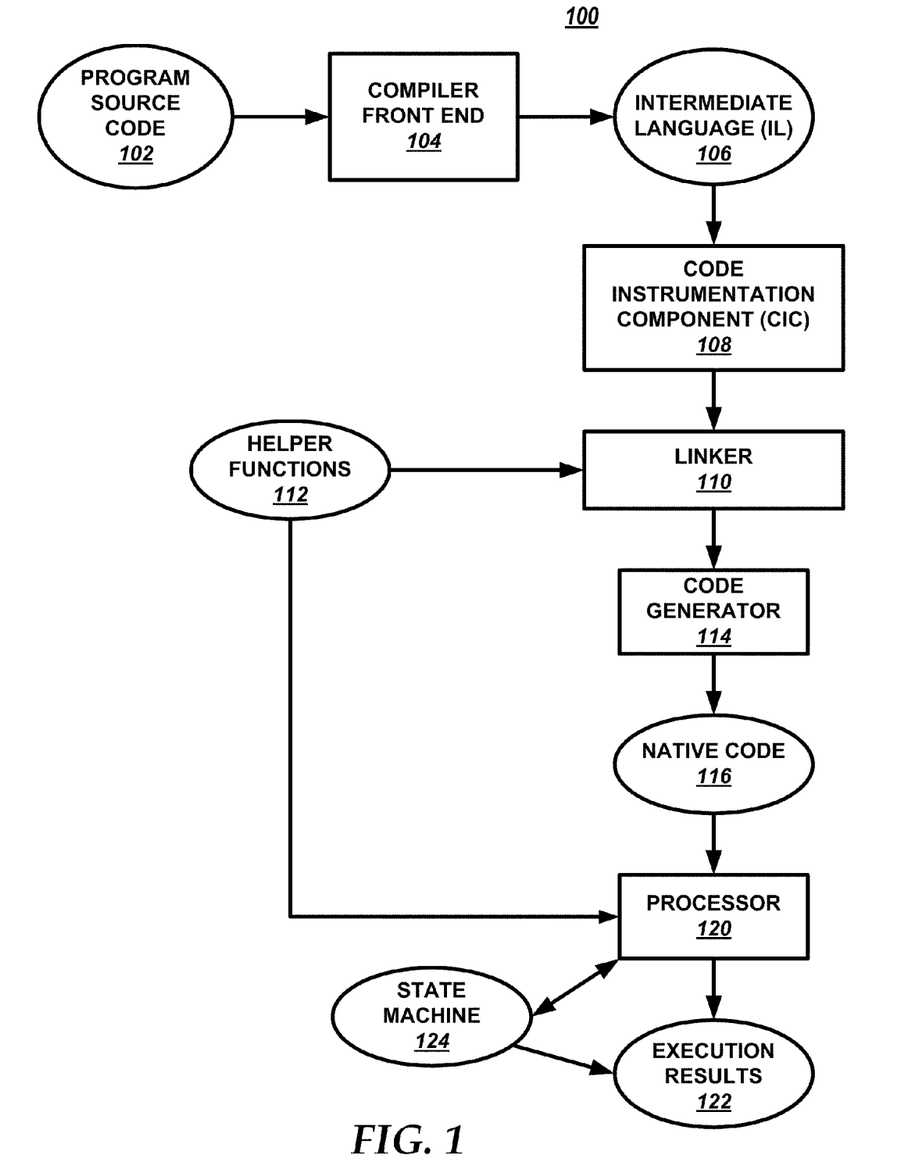
FIG. 1 is a block diagram of a computer system in which mechanisms described herein may be implemented.

FIG. 1 is a block diagram of a computer system 100 in which mechanisms described herein may be implemented. FIG. 1 is only an example of a suitable system configuration and is not intended to suggest any limitation as to the scope of use or functionality of the present invention. Thus, a variety of system configurations may be employed without departing from the scope or spirit of the present invention.

As illustrated, system 100 includes program source code 102, which may be a high level language representation of a target computer program. Examples of a high level language include F-Sharp (F#), Visual Basic, or various other high level languages. LINQ, which is a combination of a language and a library extension, is another example of program source code 102. A language that is compiled into an intermediate language before being compiled into native code is sometimes referred to as a "managed language." A program may include one or more functions. A program may reside in one or more files or other storage representations. A program may include one or more libraries, which may be integrated or distributed in a variety of ways. Thus, program source code 102 may represent a program library or a portion thereof.

As illustrated, system 100 includes compiler front end 104. In one implementation, compiler front end includes a lexical analyzer, a syntax analyzer (parser), and a semantic analyzer, though various other components or configurations may be employed. In one embodiment, compiler front end 104 processes target program source code 102, translating it into an intermediate language module 106. In one implementation, intermediate language module 106 may represent the entire program source code 102 and include multiple functions, though it may include only a portion of the program source code 102 or a portion of a function. In one implementation, intermediate language module 106 is stored as one or more files. In one implementation, intermediate language module 106 includes a binary sequence of instructions, or a binary stream, that corresponds to target program source code 102.

Though not illustrated, in one embodiment the system may include a run-time manager, which is a system component that manages execution of the computer program. In various configurations, a run-time manager may perform one or more of a number of actions, including loading program functions that are invoked by the execution of the computer program, translation of the program functions, locating and loading libraries or other resources employed by the program, or invocation or managing various program resources. A runtime manager may be described as implementing a system framework that provides various resources and services to the executing computer program.

In one configuration, a run-time manager includes a just-in-time (JIT) compiler or a portion thereof. Generally, a JIT compiler employs a mechanism in which an intermediate language representation of a program function is loaded and translated into a native language representation in response to its first invocation. For example, when a running program calls or invokes a function for the first time, in response to detecting the call the intermediate language representation of the function can be quickly compiled into native code and then run. The native language representation may be stored in memory so that the translation is not needed for subsequent invocations. One example of a run-time manager is the Common Language Runtime (CLR) component, by Microsoft Corporation, of Redmond, Wash. The CLR component employs an intermediate language representation known as the Common Intermediate Language (CIL). In one configuration, a JIT compiler of the run-time manager may translate the IL to native code immediately prior to execution, in response to detecting an invocation of the program or function. In one embodiment, a system may employ multiple processes, such that a JIT compiler may include a process that loads or translates a function concurrently with execution of execution of another function. The system may detect an invocation of a function prior to the execution of the invocation, so that at least a portion of the loading or translation is performed prior to the execution of the invocation. The term "detection" includes detection of an invocation, during runtime, prior to execution of the invocation. In one configuration, the run-time manager may translate the IL to native code prior to runtime.

As illustrated in FIG. 1, code instrumentation component (CIC) 108 may receive a function from IL module 106 and perform various transformations, such as inserting instructions in specific locations. Modifications may include adding, deleting, moving, or modifying program instructions. The process of inserting or modifying program instructions is referred to as "instrumentation."

System 100 may include linker 110, which performs various operations of combining and linking program functions, modifying or inserting variable or function references, or the like. In one embodiment, linker 110 may retrieve one or more helper functions 112 and combine these functions with an intermediate language program to produce a linked program.

System 100 may include code generator 114, which translates an intermediate code representation into native code 116. Native code 116 may be a machine language, a virtual machine language, or another representation that may be executed by a physical or virtual processor. Compiler front end 104, code instrumentation component 108, and code generator 114 each perform code translation functions. The term "code translator" may refer to any one or more of these components or other components that facilitate a translation of a program representation into another program representation, such as native code 116.

Processor 120 may receive native code 116 and execute program instructions, to produce execution results 122. In one configuration, processor 120 may include one or more central processing units, one or more processor cores, an ASIC, or other hardware processing component and related program logic. In one configuration, processor 120 may include a software component simulating a hardware processing unit. Processor 120 executes instructions in the native code 116. As used herein, the term "runtime" refers to a point or interval during the execution of native code 116, including times when the execution may be paused.

Execution results 122 is a logical representation of the results of executing the native code 116. The results may include one or more of modifications to computer storage or computer memory, communication with other processes or computing devices, audio or video output, or control of various system or external components.

In one embodiment, a representation of a state machine is generated by a code translator and included with native code 116. Processor 120 may generate, manipulate, or employ state machine 124, which is a runtime representation of a state machine. State machine 124 may contribute to execution results 122.

System 100 may be a subsystem of a development system. A development system may include one or more computing devices that are used by a program developer or a user as part of a program development, testing, or documentation process. The components of system 100 may be distributed among one or more computing devices, each of which may communicate with the others by employing one or more of various wired or wireless communication protocols such as IP, TCP/IP, UDP, HTTP, SSL, TLS, FTP, SMTP, WAP, Bluetooth, WLAN, or the like. In one configuration, native code 116 may be developed with a development system and distributed to one or more other computing devices where they are executed.

A computing device may be a special purpose or general purpose computing device. Example computing devices include mainframes, servers, blade servers, personal computers, portable computers, communication devices, consumer electronics, or the like. A computing device may include a general or special purpose operating system. The Windows® family of operating systems, by Microsoft Corporation, of Redmond, Wash., are examples of operating systems that may execute on a computing device of a development system.

FIG. 1 is only an example of a suitable system and is not intended to suggest any limitation as to the scope of use or functionality of the present invention. Thus, a variety of system configurations may be employed without departing from the scope or spirit of the present invention. For example, CIC 108 or linker 110 may be combined with compiler front end 104. Some systems may translate directly into native code without an intermediate language. Various other configurations may be employed.

Figure 2:
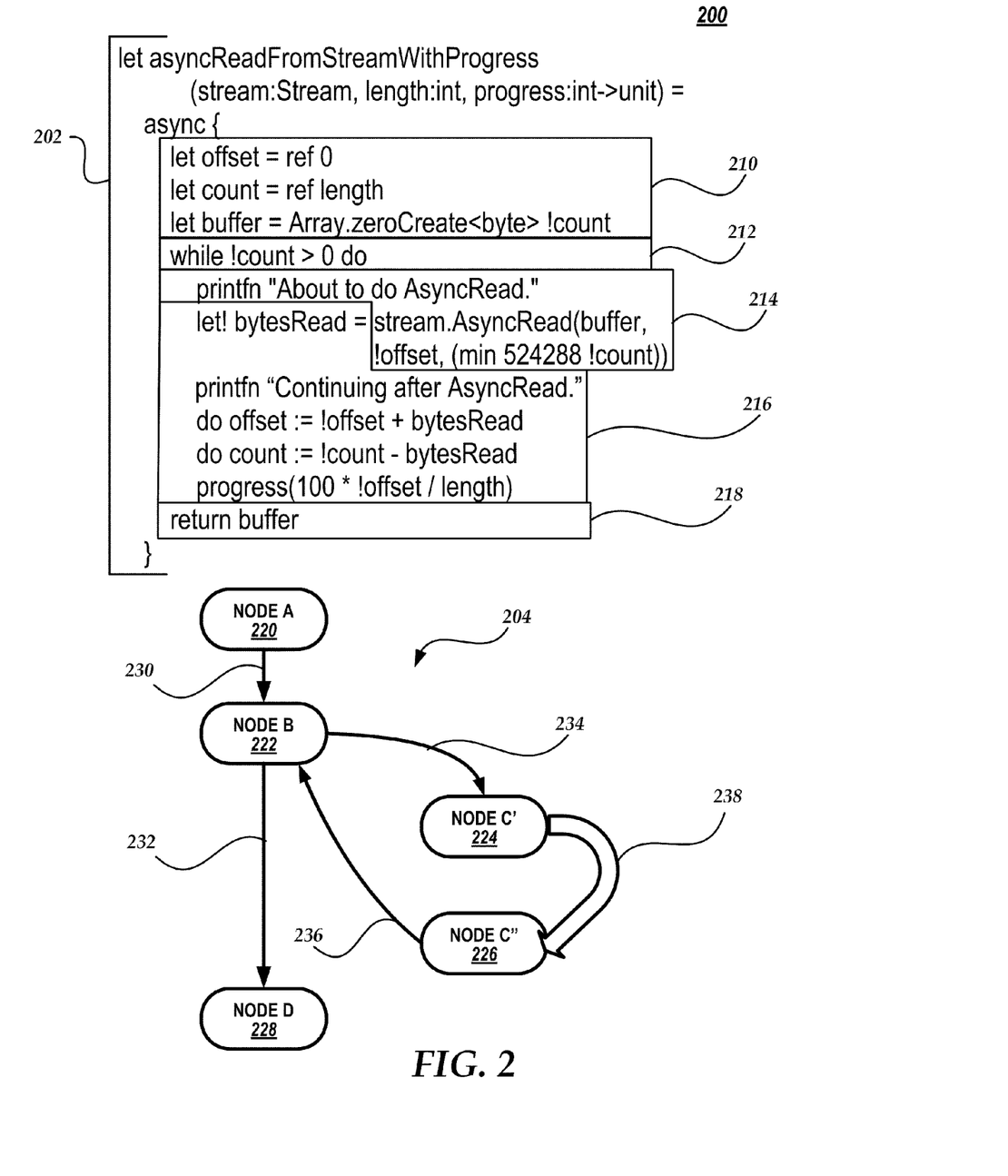
FIG. 2 is an example asynchronous workflow upon which at least some of the mechanisms described herein may be employed.

FIG. 2 is an example asynchronous workflow 200 upon which at least some of the mechanisms described herein may be employed. FIG. 2 illustrates two representations of asynchronous workflow 200. Source code snippet 202 may be a portion of program source code 102. In this example, the F# programming language is used for illustration, though other languages may also be used. F# is a programming language that includes aspects of functional programming and imperative programming.

In the example source code snippet 202, the async construct generates an object that includes specifications of tasks to be executed. A subsequent invocation of the object (not shown) will execute the tasks and return a value upon completion. In F#, the language construct "let! var=expression" is an instruction to perform the specified asynchronous operation expression, wait for the result, and bind the result to var when the operation completes. In some implementations, the rest of the workflow is suspended and becomes a callback waiting for a system event to execute. The example source code snippet 202 is divided into five code blocks, 210-218. When compiled and executed, this portion of the program does the following.

The assignment statements of code block 210, and the beginning of the while loop at code block 212 are executed sequentially.

An asynchronous operation is invoked; the operation reads from a stream and places the input into the variable buffer.

The program releases its thread and asynchronously awaits a response to the request.

It gets the response after the asynchronous action is completed.

The remainder of the while loop executes synchronously.

The loop repeats until complete and then returns the buffer.

In one embodiment, during a program translation phase, a compiler generates a directed graph representing possible control flows during a subsequent execution of the program. Generating a directed graph may include logic that parses and analyzes program source code, performs a control flow analysis, and generates a directed graph with nodes representing blocks of program instructions. Nodes of the directed graph may be subdivided by identifying asynchronous instructions, such as the call to AsyncRead( ) in code snippet 202, and splitting the nodes at a point after each of these instructions.

Directed graph 204 illustrates an example of a directed graph corresponding to program snippet 202. In directed graph 204, node A 220 corresponds to code block 210; node B 222 corresponds to code block 212; node C' 224 corresponds to code block 214; node C'' 226 corresponds to code block 216; node D 228 corresponds to code block 218. If there were no asynchronous instructions in code snippet 202, node C' 224 and node C'' 226 may be combined into one node. However, as discussed herein, the program instructions are split into two separate nodes at the point of the asynchronous instruction.

Directed graph 204 also includes transitions 230-238. Transition 238 is an asynchronous transition, representing the transition between node C' 224 and node C'' 226 as a result of the asynchronous instruction.

In one embodiment, each node 220-228 of directed graph 204 may include one or more instructions that are to be executed synchronously within the node.

In one embodiment, an asynchronous portion of a program, such as example code snippet 202, is transformed into a state machine. Each node of the state machine may include one or more synchronous instructions. Transitions indicate a change of state, and correspond to an action that invokes the state change. For example, directed graph 204 may be transformed into a state machine in which each node corresponds to a state. Transitions 230, 232, 234, and 236 represent synchronous transitions, in which completion of a node is an action that triggers a state change. Transition 238 represents an asynchronous transition, in which completion of node C' 224 together with completion of the asynchronous action invoked by instructions of node C' 224 trigger a state change to node C'' 226.

Figure 3:
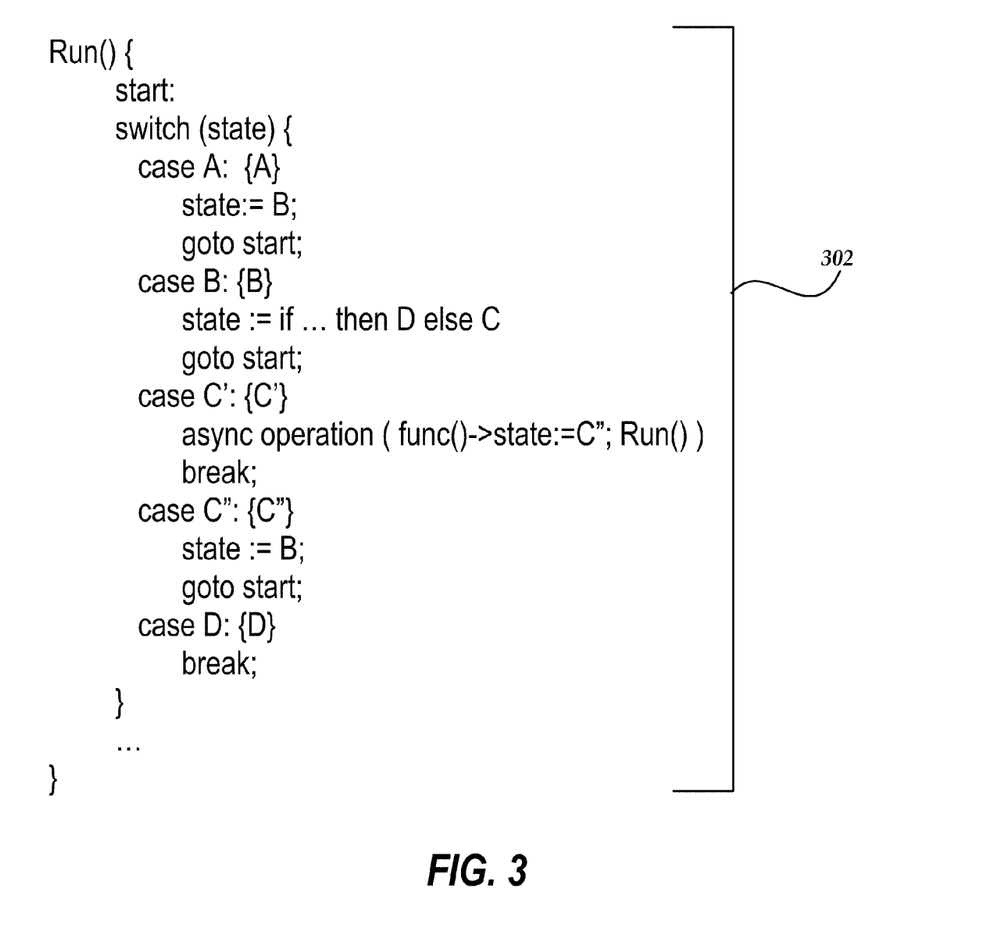
FIG. 3 illustrates a pseudocode that illustrates a translation of the code snippet of FIG. 2 that may be performed in one embodiment.

FIG. 3 illustrates an example pseudocode 302 that illustrates a translation of code snippet 202 that may be performed by a compiler front end or other translator component in one embodiment. Pseudocode 302 implements a state machine corresponding to directed graph 204.

As illustrated, pseudocode 302 includes a Run( ) function that begins with a start label. Though code snippet 202 does not include a Run( ) function, a translation process may create such a function to encompass, or wrap, the state machine. A switch statement includes five cases, each one corresponding to node A 220, node B 222, node C' 224, node C'' 226, or node D 228, respectively. Each case of the switch statement executes the program instructions of the corresponding node. These correspond to the program instructions of code blocks 210-218, respectively. Considering each state to be an identification of a node, the switch statement transfers control to the instructions of a code block corresponding to the node. At each of cases A, B, and C''', the code block is executed, and the state is set to the next state of the state machine. Control is then transferred to the location of the start label, where the switch statement is reexecuted. Case D does not jump back to start because it ends the function.

Case C' corresponds to node C' 224 and code block 214. This case executes the code block. It then invokes the asynchronous operation, passing the callback that, when executed by the asynchronous operation at its completion, will set the state to C'' and execute Run( ). After invoking the asynchronous operation, control flow exits the switch statement and exits the Run( ) function. System or library code that implements an asynchronous workflow may execute the asynchronous operation. When it is complete, it may execute the callback, which may, as described above, set state to C'' and re-invoke Run( ). This invocation of Run( ) will reenter the state machine, perform the switch again, and continue at the C'' case.

Figure 4A:
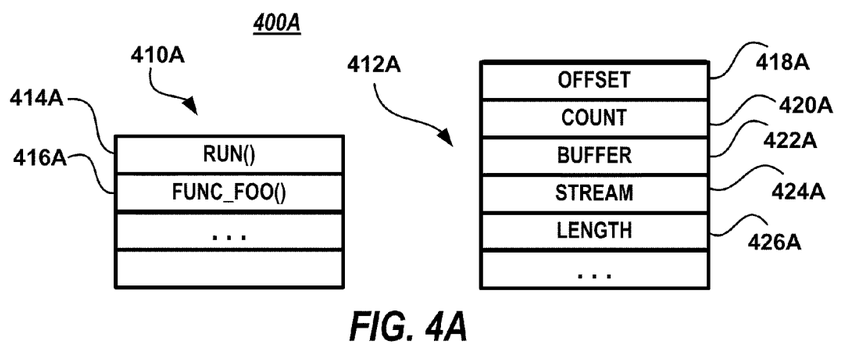
FIGS. 4A-C illustrate example runtime data structures that may be generated during runtime of a computer program as a result of employing at least some of the mechanisms described herein.
Figure 4B:
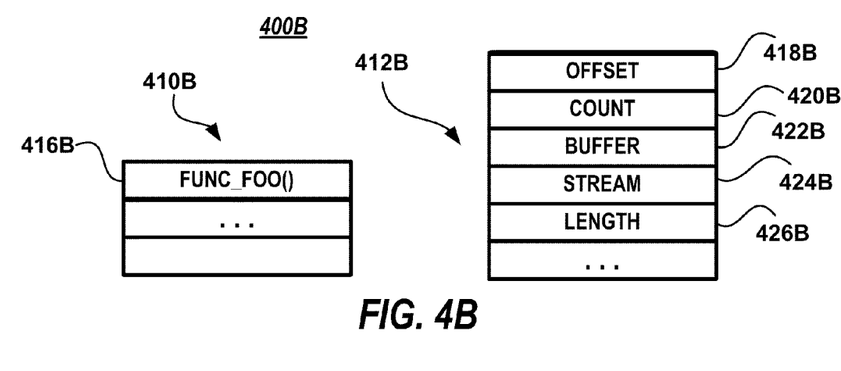
Figure 4C:
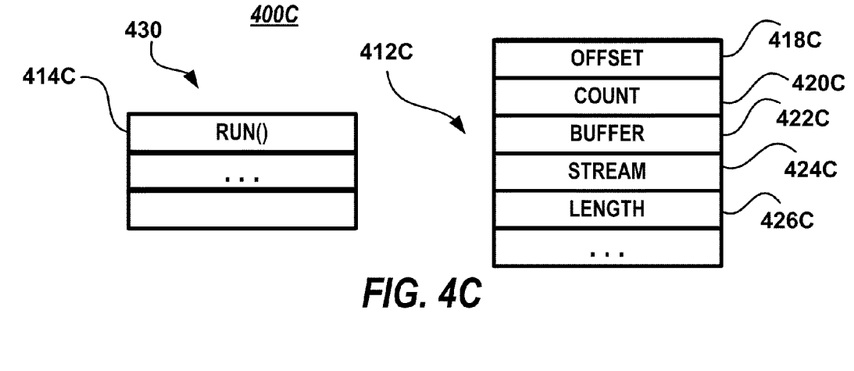

FIGS. 4A-C illustrate example runtime data structures 400A-C that may be generated during runtime of a computer program as a result of employing at least some of the mechanisms described herein. In the discussion of FIGS. 4A-C, components having the same base reference number and different letter suffixes refer to the same component at different times during a runtime of a computer program. FIG. 4A represents data structures 400A at a point of executing pseudocode 302 while in node C' 224, just prior to invoking the asynchronous function call. As illustrated, runtime stack 410A includes a frame 414A corresponding to the Run( ) function of pseudocode 302. Below frame 414A is a frame 416A corresponding to function func_foo( ) that may include the program code of code snippet 202 (FIG. 2). An instance of a function that has a corresponding stack frame is said to be "active." As illustrated, one instance of func_foo( ) and one instance of Run( ) are active. Though Run( ) is not a specified function in code snippet 202, as discussed herein, a translator may generate program code to implement such a function.

Variable closure is a mechanism of capturing elements, such as program variables, for subsequent use even though the original elements may have changed or the function that defines them no longer exists. Program variables may, for example, be saved in a location in heap memory. FIG. 4A also illustrates a variable closure structure 412A that includes entries for each local variable or parameter of the Run( ) function that is closed over. In this example, entries 418A, 420A, 422A, 424A, and 426A correspond to the local variables offset, count, and buffer, and parameters stream and length, respectively. Each of these closed over variables may be seen in the original program code of code snippet 202, though this level of detail is not shown in pseudocode 302. References to each of these closed over variables while executing the Run( ) function access the corresponding entry in variable closure structure 412A.

Runtime stack 410B and variable closure structure 412B, of FIG. 4B correspond to runtime stack 410A and variable closure structure 412A, respectively. Each of the runtime data structures 400B of FIG. 4B illustrates the corresponding structure of FIG. 4B at a subsequent point in time, after the asynchronous function has been invoked and the Run( ) function has exited, but before the Run( ) function has been invoked as a callback. Runtime stack 410B does not include an entry for the Run( ) function. Function func_foo( ) is at the top of the stack. In the illustrated embodiment, variable closure structure 412B remains, including each of the entries 418B-426B for closed over variables discussed above.

Variable closure structure 412C, of FIG. 4C corresponds to variable closure structure 412B, and illustrates the variable closure structure at a subsequent point in time, after the Run( ) function has been invoked as a callback function and the state machine is in the state of case C'', while in node C'' 226. Runtime stack 430 may be the same as runtime stack 410 at a subsequent time, or it may be a runtime stack of a different thread. In some configurations, the Run( ) function may be invoked on the same thread as its parent function. In some configurations, the Run( ) function may be invoked on a different thread. As illustrated, frame 414C, corresponding to the Run( ) function, has been pushed onto runtime stack 430. In the illustrated embodiment, frame 414C and frame 414A each correspond to a single instance of the same program code. Frame 414C is therefore said to be equivalent to frame 414A. To be clear, a recursive function may have two instances, each with a corresponding frame on the runtime stack, but they would not be considered equivalent. Also, they may have different instances of local variables.

An instance of Run( ) is now active. As illustrated, variable closure structure 412B remains, including each of the entries 418B-426B for closed over variables discussed above. The value for each of the closed over values is preserved. Though the function Run( ) exited and was popped from runtime stack 410, and then pushed back onto the stack, the use of variable closure structure 412 enables each closed over variable to be preserved and accessed in the same manner as during the previous instance of the Run( ) function.

It may be said that this mechanism simulates a situation in which the Run( ) function did not exit between the asynchronous invocation of node C' 224 and the subsequent execution of program code from node C'' 226. One result of this is that, though the asynchronous invocation of node C' 224 (and corresponding block 214) may be executed multiple times during the execution of pseudocode 302, at most one runtime stack frame corresponding to the Run( ) function is on the stack. This may avoid recursive calls to implement the asynchronous structure and a runtime stack that expands with multiple instances of the Run( ) function.

Figure 5:
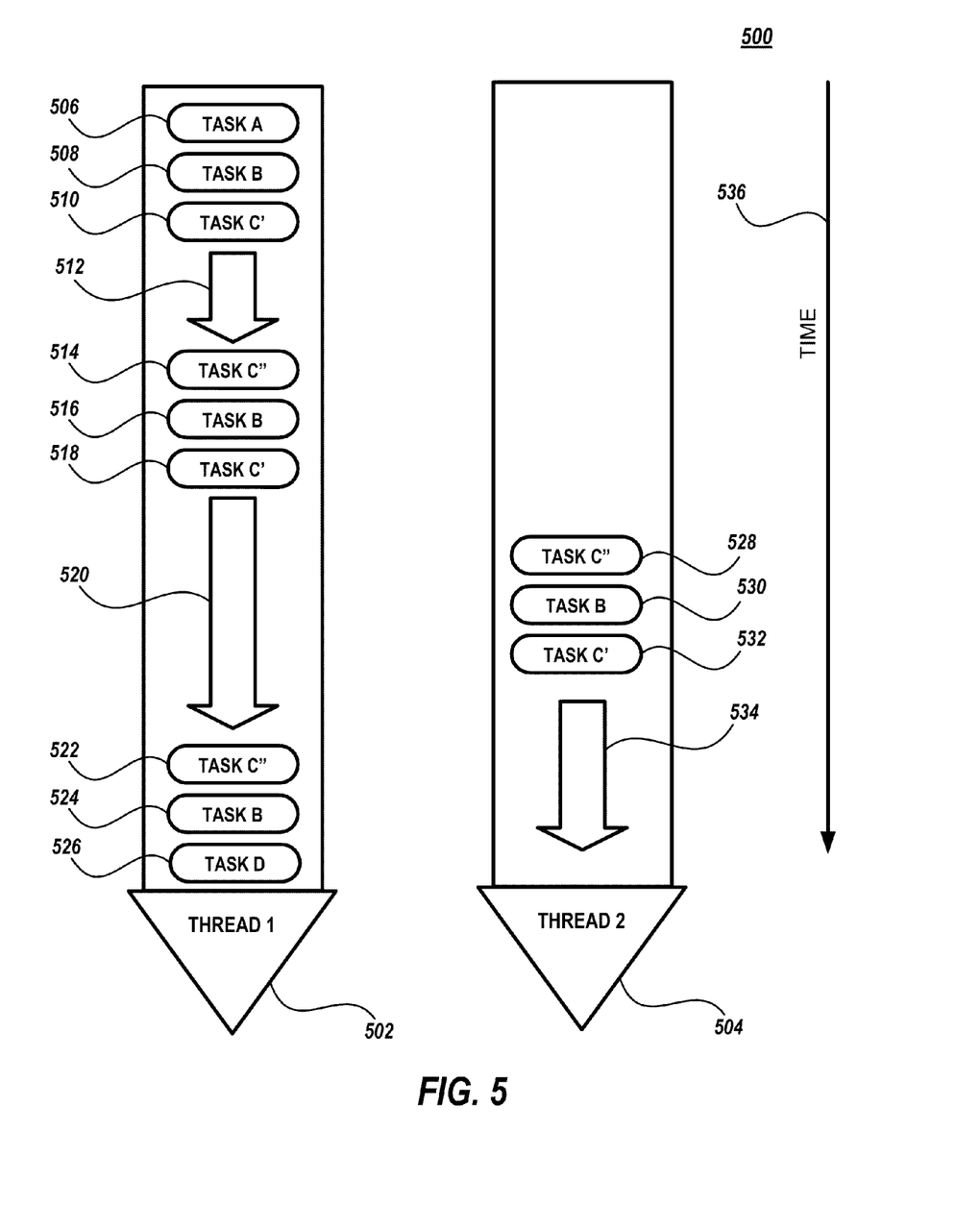
FIG. 5 illustrates an example multithreaded computer environment that may result from execution of a computer program such as illustrated in FIG. 2.

FIG. 5 illustrates an example multithreaded computer environment 500 that may result from execution of a computer program such as illustrated in FIG. 2. Computer environment 500 as illustrated includes thread 1 502 and thread 2 504. These may be hardware threads, software threads, or a combination thereof. The threads may be members of a thread pool that are shared by a process or application. A typical computer environment includes many threads, though only two are illustrated herein.

Computer environment 500 includes multiple instances of tasks that execute on one of thread 1 502 or thread 2 504. For simplicity, each instance of a task is referred to as a task. Each task is labeled to correspond to a code block and node of FIG. 2. Thus, task A 506, task B 508, task C' 510, and task C'' 514 correspond to node A 220, node B 222, node C' 224, and node C'' 226, respectively.

Timeline 536 shows that each thread is illustrated in temporal order, with time increasing in the downward direction. Thus the ordering of tasks from top to bottom in a specific thread illustrates the temporal ordering of these tasks. In a multithreaded environment with asynchronous tasks, many different configurations are possible. It should be understood that FIG. 5 shows only one of the numerous possible configurations, to illustrate mechanisms described herein.

As illustrated, task A 506, task B 508, and task 510 execute consecutively on thread 1 502. As discussed herein, node C' 224 includes an asynchronous function call. In a multithreaded system, an asynchronous call allows the thread in which it executes to become available to other tasks. Arrow 512 represents one or more tasks other than tasks A-D of the example asynchronous structure illustrated in FIG. 2. These may be tasks from another part of the same process, another process of the same program, or another program. These tasks are referred to as external tasks in this discussion.

Upon completion of the asynchronous operation of task C' 510, task C'' 514 may be scheduled to execute on a thread. In the illustrated example, the task associated with arrow 512 has completed, and task C'' 514 executes on thread 1 502. Because there is not an asynchronous operation in task C'' 514, task B 516 (representing another instance of task B 508) also executes on thread 1 502. Similarly, another instance of task C' 518 executes on the same thread.

Once again, the asynchronous operation of task C'518 releases thread 1 502, allowing one or more external tasks, represented by arrow 520, to execute on the thread. At a time when the operation of task C' 518 completes, the operating system in this example schedules another instance of task C'' 528 to execute on thread 2 504. Task B 530 and task C' 532 follow task C'' 528 and execute on thread 2 504.

The asynchronous operation of task C'532 releases thread 2 504, allowing one or more external tasks, represented by arrow 534, to execute on the thread. At a time when the operation of task C' 532 completes, the operating system in this example schedules another instance of task C'' 522 to execute on thread 1 502. Task B 524 follows task C'' 522 and executes on thread 1 502. In this iteration, the program flows from node B to node D, and thus task D 526 executes on thread 1 502, completing the execution of the asynchronous structure.

FIG. 5 provides an illustration of how thread scheduling may work with an asynchronous program structure. As shown, an asynchronous call may release a thread for use by external tasks. When a continuing task resumes, it may execute on the same thread or it may "hop" to a different thread, as task C'' 528 hopped to thread 2 504. Multiple workflows may execute on a set of fewer threads than the number of workflows, reducing or even eliminating blockages due to a blocked workflow holding a thread.

In some configurations, it may be desirable for a set of one or more tasks to remain on a designated thread. For example, it may be desirable for tasks related to a user interface to remain on a UI thread. Language constructs or libraries may provide mechanisms to enable tasks to remain on a specified thread or pool of threads. As illustrated by the scheduling of tasks 506, 508, and 510, one or more external tasks represented by arrow 512, and tasks 514, 516, and 518, mechanisms enable invoking asynchronous functions and allowing other tasks to continue on the same thread, therefore avoiding or minimizing any blocking that may occur.

Figure 6:
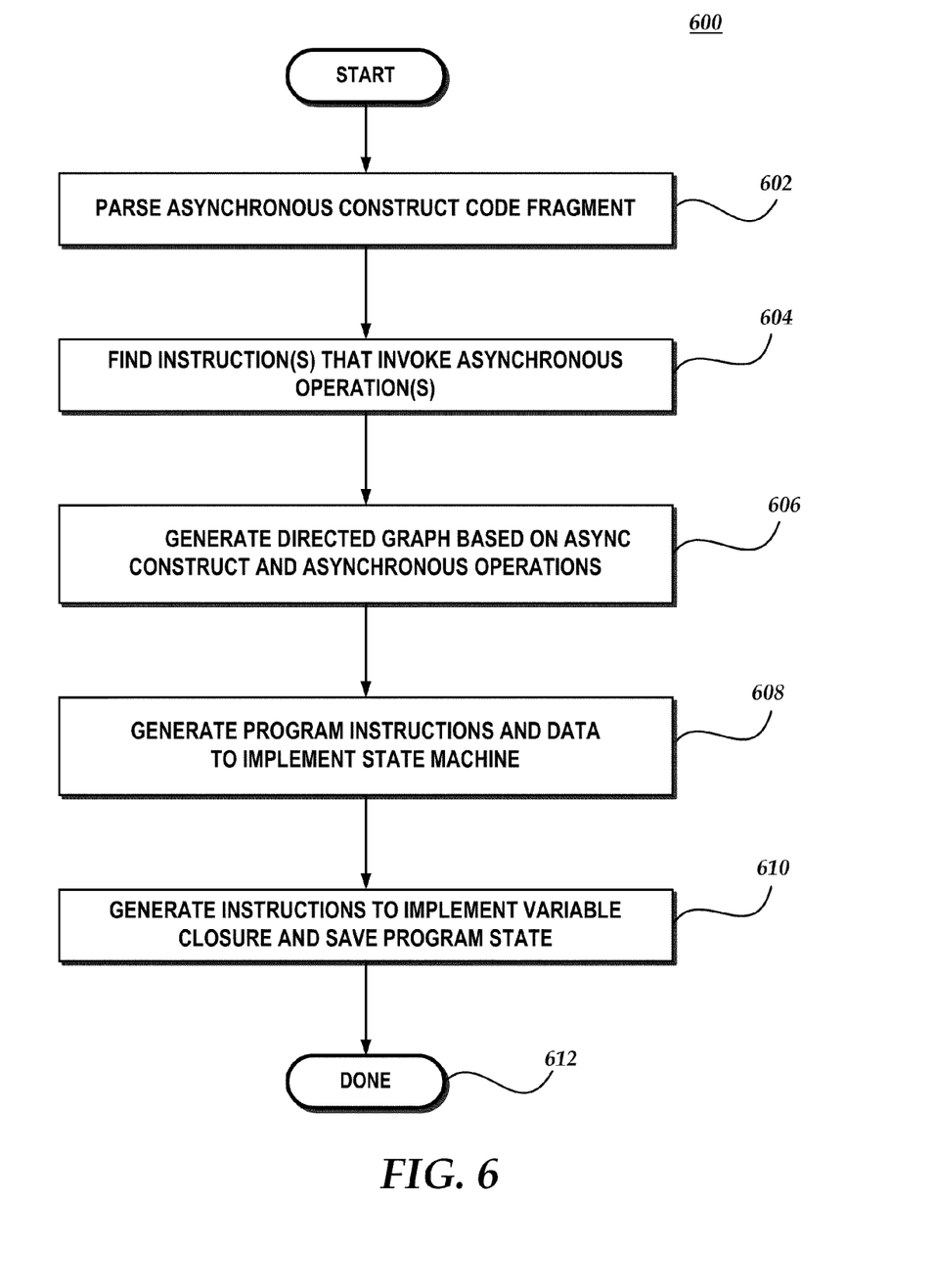
FIG. 6 is a flow diagram illustrating an example embodiment of a process of translating program code to employ a state machine for implementing an asynchronous workflow.

FIG. 6 is a flow diagram illustrating an example embodiment of a process 600 of translating program code to employ a state machine for implementing an asynchronous workflow. In one embodiment, some of the actions of process 600 are performed by components of computer system 100 of FIG. 1. In particular, compiler front end 104, code instrumentation component 108, or code generator 114 may perform at least portions of process 600. In one embodiment, the program code being translated may be program source code 102 or intermediate language module 106. In one embodiment, process 600 may be performed in two or more stages. For example, a portion may be performed by compiler front end 104 and a portion performed by code instrumentation component 108. Process 600 may be a portion of a parent process that performs various program translation actions. It may be integrated into a compiler or invoked as an external component.

The illustrated portions of process 600 may be initiated at block 602, where a code fragment having an asynchronous construct, such as illustrated by code snippet 202, may be parsed. An asynchronous construct may be a program fragment that includes an asynchronous operation. The process may flow to block 604, where one or more instructions that invoke one or more asynchronous operations are found, or determined based on the parsing. As discussed herein, in the F# language, the "let!" operator indicates an asynchronous operation in the assignee expression, though other operators or constructs may also indicate an asynchronous operation.

The process may flow to block 606, where a directed graph may be generated based on the instructions of the asynchronous construct and the asynchronous operations. In one implementation a directed graph may be generated based on the control flow of the construct without regard to asynchronous operations; the graph may then be modified by breaking up nodes that include at least one asynchronous operation. In one implementation, the one or more asynchronous operations may be considered when generating an initial directed graph. Directed graph 204 of FIG. 2 is an example of a directed graph that may be generated by the actions of block 606.

The process may flow to block 608, where a state machine may be generated based on the directed graph. This state machine refers to instructions or data that may be subsequently used during runtime to implement a state machine. Thus, the compile-time state machine and runtime state machine are considered to be representations of the same state machine. Though FIG. 6 includes distinct blocks 606 and 608 for the corresponding actions, in some implementations, the actions of these blocks may be combined to generate a state machine based on the asynchronous construct and the one or more asynchronous operations.

The process may flow to block 610, where instructions may be generated to save elements of the program state, for subsequent use during runtime when executing the state machine. This may include instructions for implementing a variable closure, to enable local variables and parameters to be closed over during runtime, as discussed herein. In one implementation, this may include instructions to generate a variable closure for at least some program variables used by program code in the asynchronous construct. In one implementation, the current state of the state machine, as represented by the variable state in pseudocode 302, may be saved in a structure distinct from the variable closure.

The process may flow to done block 612, and exit or return to a calling program.

Figure 7:
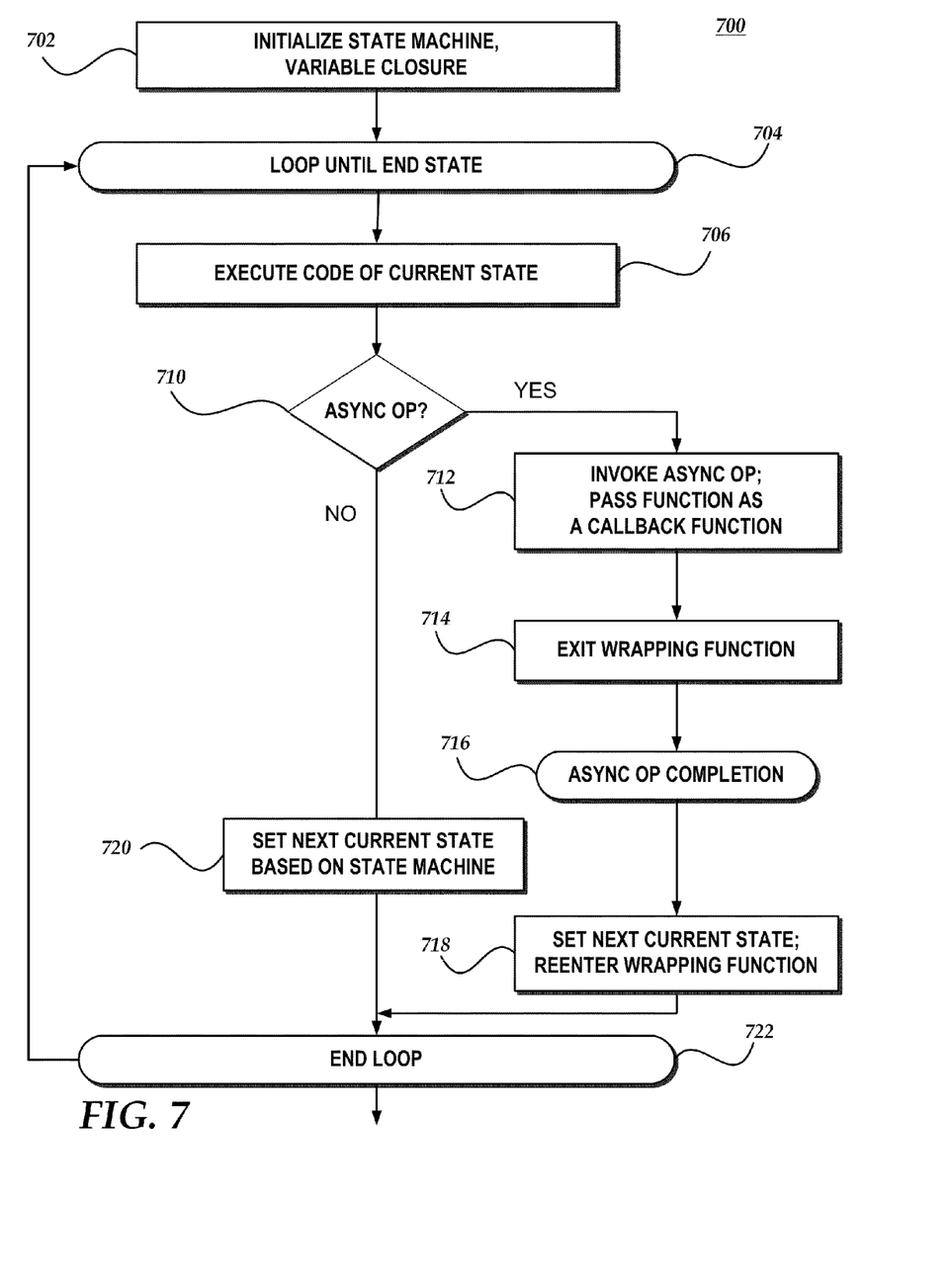
FIG. 7 is a flow diagram illustrating an example embodiment of a process of executing an asynchronous workflow in a computer program.

FIG. 7 is a flow diagram illustrating an example embodiment of a process 700 of executing an asynchronous workflow in a computer program. In one embodiment, some of the actions of process 700 are performed by processor 120 (FIG. 1) configured with executable instructions representing program source code 102, including translations resulting from process 600. Results of process 700, including intermediate states, may be considered to be at least a portion of execution results 122.

The illustrated portions of process 700 may be initiated at block 702, where a state machine and a variable closure may be initialized. In the example state machine corresponding to pseudocode 302 (FIG. 3), initializing the state machine may include one or more of initializing the value assigned to the variable state, initializing a program counter, or invoking the Run( ) function. It may include generating a table that includes correspondences between each state and a location in the program code, or loading such a table into memory. In one embodiment, initialization may include creating a variable closure that stores local variables or parameters that are accessed within the asynchronous workflow.

The process may flow to loop 704, which iterates for each state that the state machine enters, and exits when an end state has been reached or the process ends for another reason, such as an exception. Node D 228 of FIG. 2 illustrates an end state. In the illustrated embodiment, loop 704 includes blocks 706-720 and is terminated by block 722.

The process may flow to block 706, where program code of the current state may be executed. In the example of FIGS. 2 and 3, this may include program code within one of the cases of the switch statement in pseudocode 302, corresponding to one of nodes 224-228 and one of code blocks 210-218. In the first iteration, this may be node A 220 and code block 210. In iterations after the first, the program code corresponds to the state that was set in the prior iteration.

The process may flow to decision block 710, where a determination is made of whether the program code being executed for the current state includes an asynchronous operation. If it does, the process may flow to block 712, where the asynchronous operation is invoked. A function that wraps the state machine may be passed as a callback function, to be invoked when the asynchronous operation completes. A function that is generated by a translator to wrap the state machine is referred to herein as a wrapping function. In the example of pseudocode 302, the Run( ) function is such a function.

The process may flow from block 712 to block 714, where the current function exits. In the example of pseudocode 302, the Run( ) function may exit. FIG. 4B illustrates a resulting stack 410B, in which the Run( ) function has been popped from the stack. Variable closure structure 412B continues to store closed over variables.

At this point, the thread upon which the program code of the asynchronous workflow is executing may be released and becomes available for other tasks, as discussed herein. After some period of time, an event 716 occurs, which is the completion of the asynchronous operation invoked at block 712. In response to this, system code may reenter the asynchronous workflow by reentering the wrapping function. In one embodiment, this may be in the form of invoking the callback function passed in block 712. Thus, the process flows to block 718, where the wrapping function is reentered. FIG. 4C illustrates a resulting stack 430, in which the Run( ) function has been pushed onto the stack. Variable closure structure 412C continues to store closed over variables. The runtime stack and variable closure thus appear as they did prior to the invocation of the asynchronous operation. The process simulated a flow in which the wrapping function did not exit, and simply jumped back to the beginning, though the thread was released while waiting for the asynchronous operation to complete.

In one implementation, the actions of block 718 include setting the current state to be the next state, based on the state machine. In one implementation, the invocation of the asynchronous operation includes passing a lambda function with an instruction to set the next current state.

The process may flow to end loop block 722, and perform another iteration of loop 704. If, at decision block 710, it is determined that the current node does not include an invocation of an asynchronous operation, the process may flow to block 720, where the current state is set to be the next state of the state machine. In one implementation, this block may be integrated with the end loop block 722, so that the current state is not set if the loop is about to exit. As illustrated by directed graph 204 and pseudocode 302, there may be zero, one, or more options for the next state from any state.

The process may flow to end loop block 722, and selectively repeat another iteration of loop 704, based on whether the current state ends the loop. Upon exiting loop 704, the process may exit or return to a calling program, such as the program code that follows the asynchronous workflow.

While the examples discussed above show a single asynchronous operation within an asynchronous workflow, the mechanisms described herein may be applied to computer programs having one, two, or more asynchronous operations within an asynchronous workflow.

Figure 8:
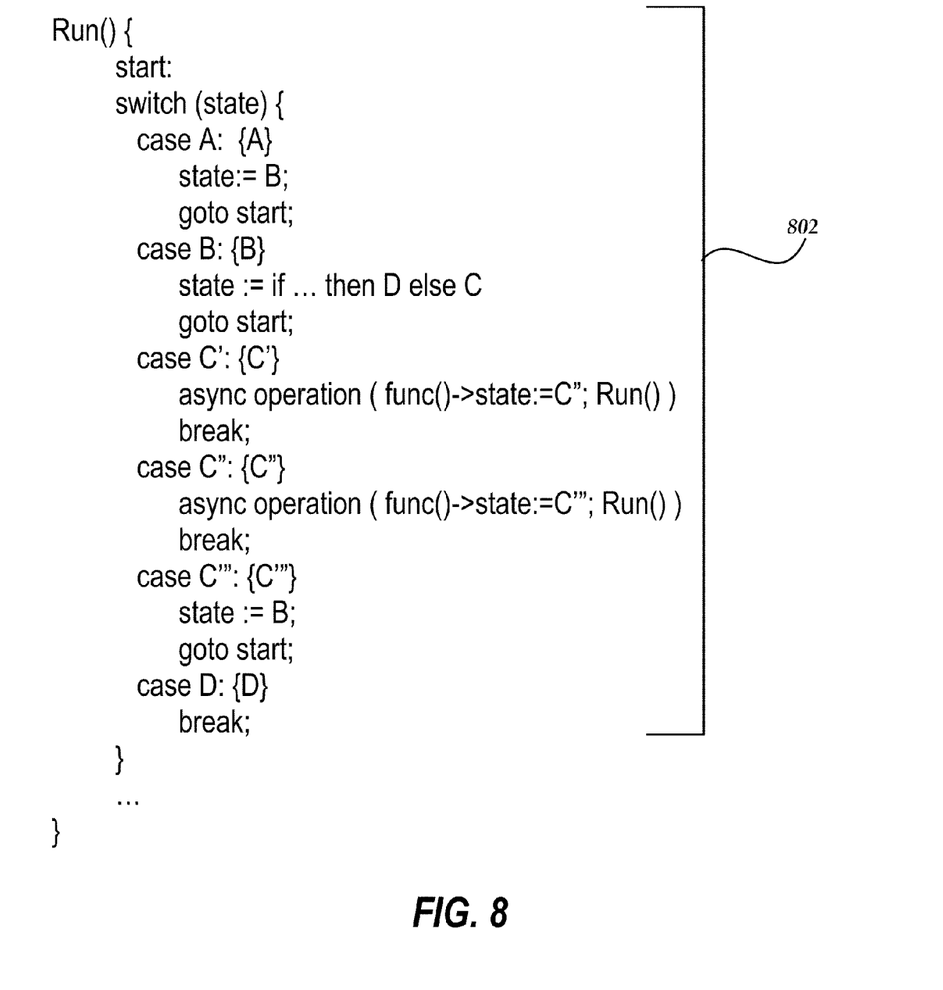
FIG. 8 is a listing of a pseudocode that illustrates a state machine having two asynchronous operations.

FIG. 8 is a listing of a pseudocode 802 that illustrates a state machine having two asynchronous operations. It differs from pseudocode 302 in that it includes an extra state, C'''. State C'' follows the asynchronous operation within state C' and includes an asynchronous operation itself.

As discussed herein, after each invocation of the asynchronous operation of state C' or C'', the Run( ) function exits. It is then reentered after the asynchronous operation completes. There is therefore no recursion of the Run( ) function, and during the execution of the program code corresponding to each state, there may be a single runtime stack frame corresponding to the Run( ) function, and a single allocation for the variable closure. After each asynchronous operation, the Run( ) function exits, and the runtime stack may be as shown in FIG. 4B. After Run( ) has been invoked as a callback function following the asynchronous operation of state C'' and the function enters state C''', the runtime stack may be as shown in FIG. 4C, with a frame 414C that is equivalent to the frame 414A.

Figure 9:
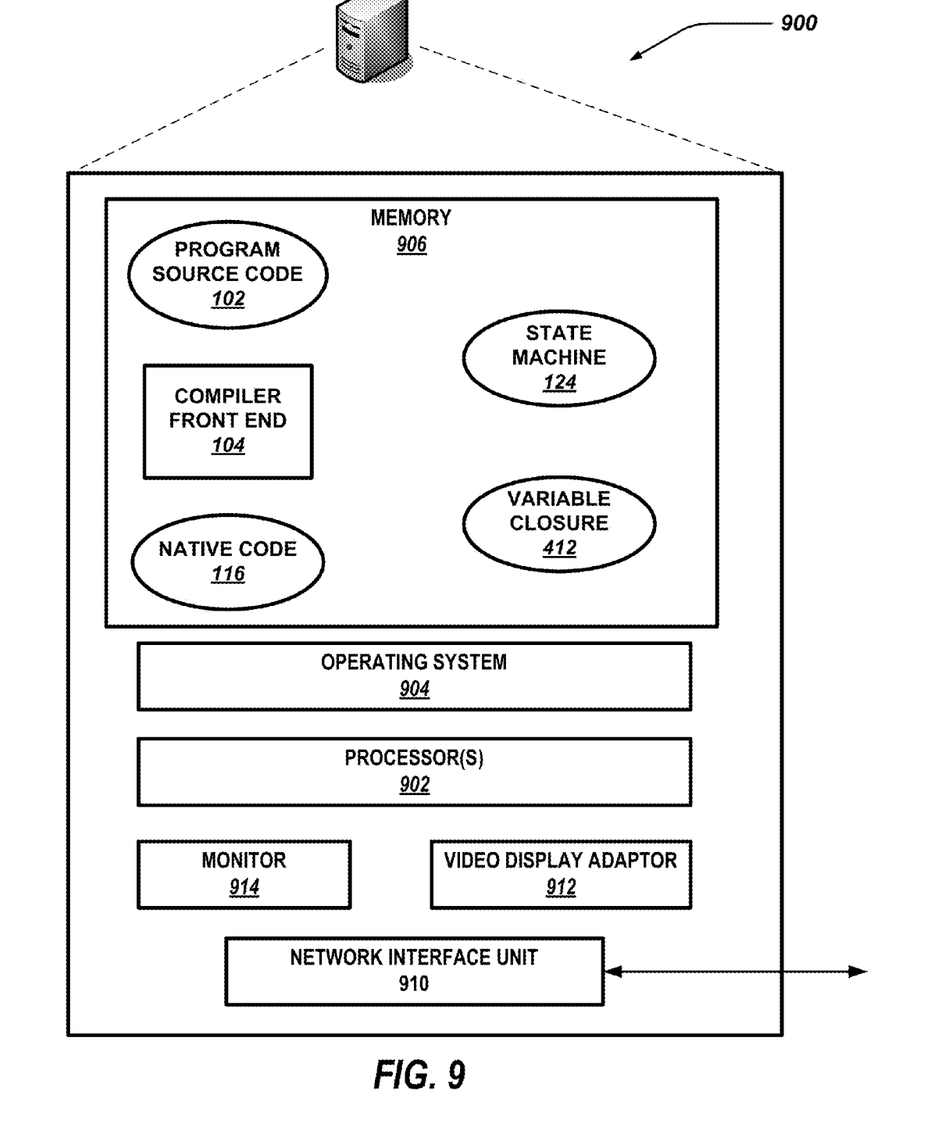
FIG. 9 shows one embodiment of a computing device, illustrating selected components of a computing device that may be used to perform functions described herein.

FIG. 9 shows one embodiment of a computing device 900, illustrating selected components of a computing device that may be used to perform functions described herein, including processes 600 or 700. Computing device 900 may include many more components than those shown, or may include less than all of those illustrated. Computing device 900 may be a standalone computing device or part of an integrated system, such as a blade in a chassis with one or more blades.

As illustrated, computing device 900 includes one or more processors 902, which perform actions to execute instructions of various computer programs. In one configuration, each processor 902 may include one or more central processing units, one or more processor cores, one or more ASICs, cache memory, or other hardware processing components and related program logic. Processors 902 may include processor 120 of FIG. 1. As illustrated, computing device 900 includes an operating system 904. Operating system 904 may be a general purpose or special purpose operating system. The Windows® family of operating systems, by Microsoft Corporation, of Redmond, Wash., are examples of operating systems that may execute on computing device 900. Though not illustrated, computing device 900 may include a software framework that provides one or more of libraries, a virtual machine, or an execution environment. The Microsoft®.NET framework, by Microsoft Corporation, is an example of a software framework.

Memory 906 may include one or more of a variety of types of non-transitory computer storage media, including volatile or non-volatile memory, RAM, ROM, solid-state memory, disk drives, optical storage, or any other medium that can be used to store digital information.

Memory 906 may store one or more components described herein or other components. In one embodiment, memory 906 stores one or more of program source code 102, compiler front end 104, native code 116, state machine 124, or variable closure structure 412. Memory 906 may store any software components of system 100. Any one or more of these components may be moved to different locations in RAM, non-volatile memory, or between RAM and non-volatile memory by operating system 904 or other components.

Computing device 900 may include a video display adapter 912 that facilitates display of localized text strings to a user, or a speech component (not shown) that converts text to audio speech and presents the spoken strings to a user. Though not illustrated in FIG. 9, computing device 900 may include a basic input/output system (BIOS), and associated components. Computing device 900 may also include a network interface unit 910 for communicating with a network. Embodiments of computing device 900 may include one or more of a display monitor 914, keyboard, pointing device, audio component, microphone, voice recognition component, or other input/output mechanisms.

It will be understood that each block of the flowchart illustration of FIGS. 6-7, and combinations of blocks in the flowchart illustration, can be implemented by software instructions. These program instructions may be provided to a processor to produce a machine, such that the instructions, which execute on the processor, create means for implementing the actions specified in the flowchart block or blocks. The software instructions may be executed by a processor to provide steps for implementing the actions specified in the flowchart block or blocks. In addition, one or more blocks or combinations of blocks in the flowchart illustrations may also be performed concurrently with other blocks or combinations of blocks, or even in a different sequence than illustrated without departing from the scope or spirit of the invention.

The above specification, examples, and data provide a complete description of the manufacture and use of the composition of the invention. Since many embodiments of the invention can be made without departing from the spirit and scope of the invention, the invention resides in the claims hereinafter appended

What is claimed as new and desired to be protected by Letters Patent of the United States is:

1. A computer-based method of translating a target computer program to a target program executable code that includes program instructions to perform an asynchronous operation, comprising:
   a) determining a code fragment that includes an instruction for invoking the asynchronous operation;
   b) generating a representation of a state machine based on the code fragment and the instruction for invoking the asynchronous operation, the state machine having a first state corresponding to a first portion of the code fragment containing the instruction for invoking the asynchronous operation, and a second state corresponding to a second portion of the code fragment that is to be executed after the asynchronous operation completes; and
   c) generating executable program code for implementing and invoking the state machine at a runtime of the target computer program, the executable program code including one or more instructions for passing a wrapping function with the asynchronous invocation, the wrapping function setting and employing states of the state machine;
   the executable program code comprising computer program instructions executable by one or more processors to perform actions including:
   a) invoking the asynchronous operation from the first portion of the code fragment;

b) setting the state machine to be in the second state;
c) exiting from the first portion of the code fragment after invoking the asynchronous operation; and
d) in response to a completion of the asynchronous operation, employing the state machine to invoke the second portion of the code fragment.

2. The computer-based method of claim 1, the executable program code for implementing the state machine including one or more instructions for passing a lambda function with the asynchronous invocation, the lambda function setting a state of the state machine to the second state.

3. The computer-based method of claim 1, the executable program code for implementing the state machine including a specification of a function that includes a first fragment of executable code corresponding to the first portion of the code fragment and a second fragment of executable code corresponding to the second portion of the code fragment, logic to return from the function after invoking the asynchronous operation and before the asynchronous operation completes, and a specification that the function is to be invoked after the asynchronous operation completes.

4. The computer-based method of claim 1, the executable program code for implementing the state machine including program instructions for creating a variable closure associated with one or more variables within scope of a function that includes the first portion of the executable code fragment and the second portion of the executable code fragment.

5. The computer-based method of claim 1, further comprising generating function code that implements a function containing the code fragment, the executable program code for implementing the state machine causing a first stack frame corresponding to the first portion of the executable code fragment to be equivalent to a second stack frame corresponding to the second portion of the code fragment.

6. The computer-based method of claim 1, the target executable program code comprising computer program instructions executable by one or more processors to perform actions including maintaining a single stack frame corresponding to the state machine during each execution of the first portion of the code fragment and each execution of the second portion of the code fragment.

7. The computer-based method of claim 1, the target executable program code comprising computer program instructions executable by one or more processors to perform actions including:
   a) invoking a plurality of asynchronous operations in a corresponding state of the state machine; and
   b) maintaining a single stack frame corresponding to the state machine during each invocation.

8. The computer-based method of claim 1, the target executable program code comprising computer program instructions executable by one or more processors to perform actions including:
   a) generating a variable closure of at least one variable local to a current function;
   b) invoking an asynchronous operation from the current function;
   c) receiving an invocation of the current function after a completion of the asynchronous operation;
   d) after the invocation of the current function, employing the variable closure to access the at least one variable from the current function.

9. A computer-based system for translating a target computer program to a target program executable code that includes program instructions to perform an asynchronous operation, the system comprising:
   a) a parser, stored in a memory, that identifies asynchronous constructs in the target computer program;
   b) a translator component configured to perform actions including generating a representation of a state machine based on the asynchronous construct, the state machine having a first state corresponding to an asynchronous operation and a second state corresponding to a portion of the target computer program that is to be executed after the asynchronous operation completes; and
   c) a code generation component configured to generate executable program code that implements the state machine, the executable program code performing actions including:
      i. in the first state, invoking the asynchronous operation from a thread, the first state having a corresponding runtime stack configuration;
      ii. after invoking the asynchronous operation, releasing the thread;
      iii. after the asynchronous operation completes, executing program code in the second state, the second state having a corresponding runtime stack frame equivalent to the runtime stack frame corresponding to the first state; and
      iv. generating a variable closure structure that enables local variables to be accessed during execution of the program code in the first state or the second state.

10. The computer-based system of claim 9, the translator component comprising program instructions which upon execution by a processor generate the representation of the state machine based on a directed graph that represents control flows during a subsequent execution of the executable program code.

11. The computer-based system of claim 9, the translator component comprising a program instructions which upon execution by a processor generate a function to wrap the state machine and program instructions which upon execution by a processor generate executable program code that maintains a single instance of the function in the first state and in the second state.

12. The computer-based system of claim 9, the program instructions to perform the asynchronous operation within a translator-defined function, the system further comprising program instructions which perform the asynchronous operation plurality of times without exiting the translator-defined function and without using recursion.

13. The computer-based system of claim 9, wherein the target computer program includes source code written in a high level programming language.

14. The computer-based system of claim 9, wherein the target computer program includes source code written in a programming language that includes aspects of functional programming.

15. The computer-based system of claim 9, comprising a run-time manager.

16. A computer-readable memory comprising computer program instructions for translating a target computer program to a target program executable code, the program instructions executable by one or more processors to perform actions including:
   a) parsing the target computer program to locate a code fragment that includes at least one asynchronous operation;
   b) generating the target program executable code including instructions for implementing a state machine at a runtime of the target computer program from an instance of a function, the target program executable program code including instructions that invoke each asynchronous operation from the instance of the function and simulate resuming the instance of the function after completion of the asynchronous operation, simulating resuming the function comprising enabling an invocation of a callback function corresponding to the asynchronous operation to restore a runtime stack frame to be equivalent to the runtime stack frame prior to executing the asynchronous operation;

c) simulating resuming the instance of the function comprising exiting from the function and passing the function as a callback function in the instruction that invokes the asynchronous operation, the target program executable code further including instructions to generate a variable closure of at least one program variable accessed from within the function prior to the invocation of each asynchronous operation and after the completion of each asynchronous operation.

17. The computer-readable memory of claim 16, generating the target executable code comprising generating a directed graph based on the target computer program and creating a plurality of states of the state machine, each state of the plurality of states corresponding to a respective node of the directed graph.

18. The computer-readable memory of claim 16, the target program executable program code including a recursive call following the instructions that invoke the asynchronous operation, the actions further comprising enabling the asynchronous operation to be executed a plurality of times from within the state machine and not recursively invoking the function.

19. The computer-readable memory of claim 16, the actions further comprising generating a wrapping function that implements a state machine and invokes the asynchronous operation a plurality of times.

20. The computer-readable memory of claim 16, the target program executable code further including a state variable that represents each state of the state machine, wherein the state variable is set from within the function and is saved in a structure distinct from the variable closure.

* * * * *